(12) United States Patent
Konya

(10) Patent No.: US 6,454,349 B1
(45) Date of Patent: Sep. 24, 2002

(54) PIVOTING TRAY TABLE ASSEMBLY

(75) Inventor: Kazuhide Konya, Mercer Island, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/917,351

(22) Filed: Jul. 27, 2001

(51) Int. Cl.$^7$ ................................................. A47C 7/62
(52) U.S. Cl. ..................... 297/146; 297/188.04; 108/44
(58) Field of Search ................................ 297/144–146, 297/150, 154, 173, 188.04, 188.05, 188.06; 108/13, 43, 44, 47, 134; 312/248, 323

(56) References Cited

U.S. PATENT DOCUMENTS

| | | | | |
|---|---|---|---|---|
| 2,249,287 A | * | 7/1941 | Gearhart et al. | ............ 297/146 |
| 2,774,640 A | * | 12/1956 | Harmon et al. | ............... 108/47 |
| 3,167,036 A | * | 1/1965 | Brossard | ...................... 108/13 |
| 4,431,231 A | | 2/1984 | Elazari et al. | |
| 4,668,010 A | * | 5/1987 | Fujiwara | ................ 297/188.04 |
| 4,792,183 A | * | 12/1988 | Townsend, III | ............. 297/146 |
| 4,836,602 A | | 6/1989 | D'Almada Remedios et al. | |
| 5,547,247 A | | 8/1996 | Dixon | |
| 6,220,658 B1 | * | 4/2001 | Lukawski et al. | ........... 297/145 |

* cited by examiner

Primary Examiner—Peter R. Brown
(74) Attorney, Agent, or Firm—Alston & Bird LLP

(57) ABSTRACT

A tray table assembly is provided that includes a tray table and an arm connected to the tray table which extends from the rear portion of a seatback. The tray table is pivotable with respect to the support arm so that the same surface of the tray that faces upwardly during use that may become soiled also faces outwardly when the tray table is stowed in the seatback. A seat assembly is also provided that includes a passenger seat having a seatback defining a recess for permitting the tray table assembly to be stowed in the seatback. The seatback recess is shaped and positioned in such a way that a major surface of the tray table can only be positioned outwardly when stowed in the seatback recess, thus preventing the seat from facing the seat in the stowed position.

19 Claims, 2 Drawing Sheets

PIVOTING TRAY TABLE ASSEMBLY

FIELD OF THE INVENTION

The present invention relates to food tray tables, and more particularly to stowable tray tables which pivot to facilitate cleaning of the tray tables.

BACKGROUND OF THE INVENTION

Airplanes are equipped with tray tables for use by passengers during flight. Tray tables are typically stowed in the seatback of most passenger seats in a non-operative position, and are lowered into an operative position during flight. As a result of the stowage of the tray tables in the rear of the seatbacks, a passenger generally utilizes the tray table stowed in the seatback that is immediately forward of the passenger. The tray table is customarily connected to a set of arms which pivot downwardly from the seatback to an operative position. For example, U.S. Pat. No. 4,431,231 issued to Elazari et al. describes a reclinable seat and foldable-table assembly whereby both the seat and tray table rotate about a horizontal axis as a unit to enable the seat to recline. The tray table of U.S. Pat. No. 4,431,231 can further rotate from a stowed position in the seatback to an extended position for passenger use.

Tray tables are used for a variety of applications, but predominately are used by passengers to rest food or drinks when dining, as well as for supporting laptop computers or other articles. Consequently, passenger use can cause the tray tables to become dirty. Airlines routinely clean the tray tables during turnaround of the aircraft before reuse by other passengers. In order to clean conventional tray tables, such as those described in U.S. Pat. No. 4,431,231, the airlines must lower each tray table from its stowed position, clean the tray surface, and then raise the tray back to its initial position. This laborious process is required since the surface of the tray table that is soiled during use faces the seatback once the tray table has been stowed. Since each aircraft includes tens or hundreds of tray tables, the time necessary to clean the tray tables on one aircraft is considerable, thereby causing the airlines to incur significant labor costs and perhaps limiting turnaround time. Moreover, at least some of this time is expended unnecessarily since some tray tables may be clean and not require cleaning because in order to determine whether or not a tray table is clean, the tray table must be lowered and inspected.

It would therefore be advantageous to have tray tables that can be more easily inspected and more readily cleaned. By having tray tables that can be more efficiently cleaned, the total cabin cleaning time can be decreased, thereby directly decreasing turnaround time, reducing the indirect operating costs for the airlines, and decreasing the manpower required to clean the cabin.

SUMMARY OF THE INVENTION

The present invention overcomes the aforementioned drawbacks associated with conventional tray tables by providing a tray table assembly that is more efficiently cleaned. The tray table assembly includes a tray table and an arm connected to the tray table in such a manner that the tray table is pivotable with respect to the support arm so that the same surface of the tray that faces upwardly during use and that therefore may become soiled also faces outwardly when the tray table is stowed in the non-operative position. Thus, aircraft personnel can quickly assess whether a tray table needs to be cleaned and, if so, can clean the tray table without having to lower the tray table prior to cleaning and then stow the tray table after cleaning. Accordingly, the tray table assembly of the present invention may substantially increase the efficiency with which tray tables are cleaned.

The tray table assembly comprises an arm adapted to move between a stowed position and an extended position, and a tray pivotally connected to the arm. The tray has opposed major surfaces and is adapted to pivot while the arm is in the extended position such that the entire tray is adapted to pivot between a first position in which one major surface faces upwardly and a second position in which the other major surface faces upwardly.

The tray table assembly preferably comprises a lip proximate to a major surface that is capable of engaging opposite sides of the arm in the first and second positions. The tray table assembly also preferably comprises a pin, typically carried by the distal end of the arm, that connects the arm to the tray, thereby providing an axis about which to pivot. In this regard, the pin typically engages side surfaces of the tray which extend between the major surfaces of the tray. The tray has also first and second edges with the first edge preferably extending beyond the arm while the tray is in the first position. To avoid inadvertent tipping of the tray, the pin preferably engages the tray closer to the first edge than the second edge.

The tray table assembly may comprise more than one arm whereby the arms are spaced apart and adapted to move between a stowed position and an extended position. The tray is pivotally attached to the arms and adapted to pivot through an angle greater than 90°, and preferably up to about 180°, about an axis extending between the arms and between first and second positions while the arms are in the extended position. When the tray table assembly includes more than one arm, a plurality of pins can be used to connect a respective arm to the tray.

A seat assembly is also provided that preferably comprises a tray table assembly and a seat having a seatback defining a recess for permitting the tray table assembly to be stowed in a non-operative position. A major surface of the tray faces outwardly while the tray table assembly is stowed in the recess defined by the seatback, and the tray is adapted to pivot once the arm is extended such that the same major surface then faces upwardly. Furthermore, the recess defined by the setback is shaped and positioned in such a way that major surface of the tray table can only be positioned outwardly when stowed in the seatback recess, thus preventing the major surface from facing the seat in the stowed position.

Consequently, the invention provides a tray table assembly capable of moving between a stowed position and an extended position with the major surface of the tray that faces upwardly during use, facing outwardly when in the stowed position. Since the major surface of the tray is facing outwardly when not in use, the tray table assembly does not first need to be lowered before cleaning the tray table. Instead, the tray may be cleaned while remaining in the stowed position. By facing outwardly while in the stowed position, the tray table assembly may be readily inspected without lowering the tray. As a result, the tray table assembly decreases the total time required to both inspect the tray tables and to clean the soiled tray tables. This in turn will increase the airline's efficiency during turnaround and decrease costs required to clean the aircraft.

BRIEF DESCRIPTION OF DRAWINGS

Figure 1:
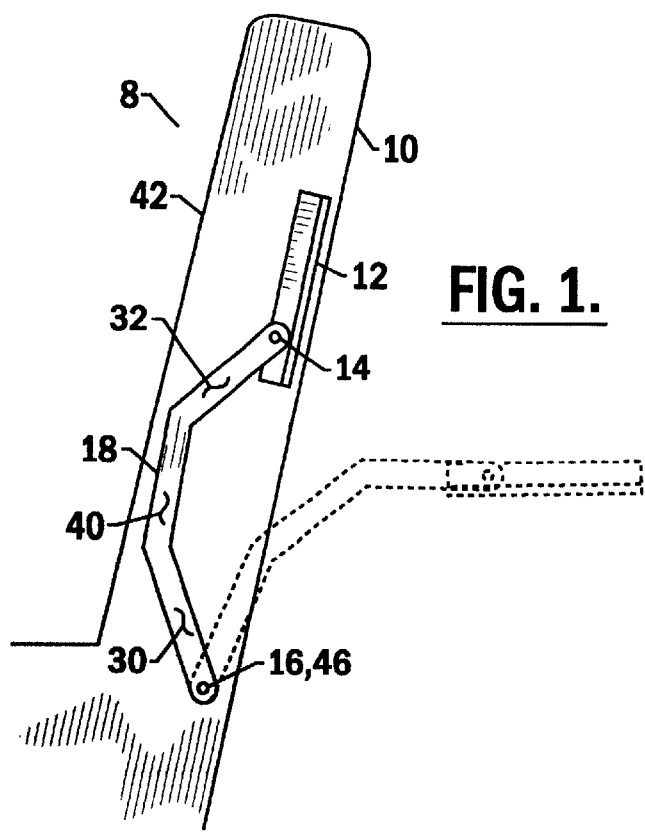
Figure 2:
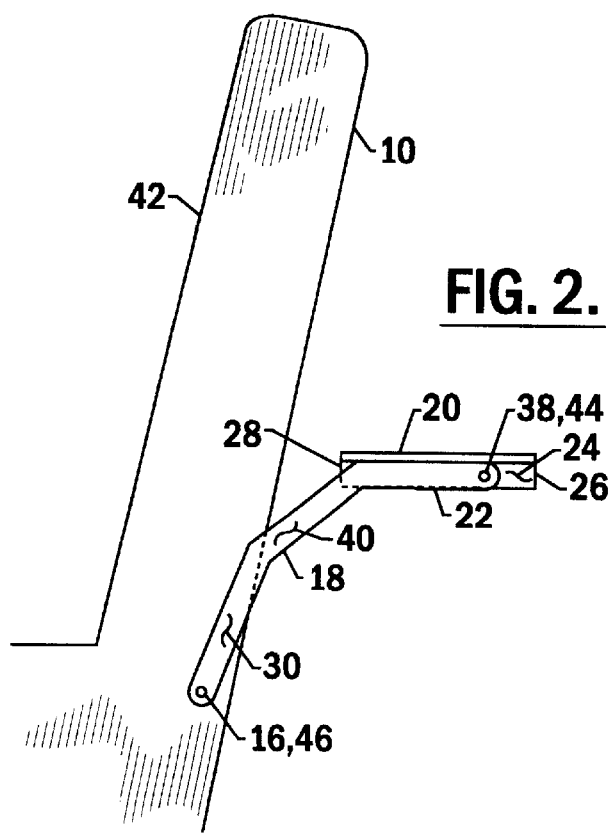
Figure 3:
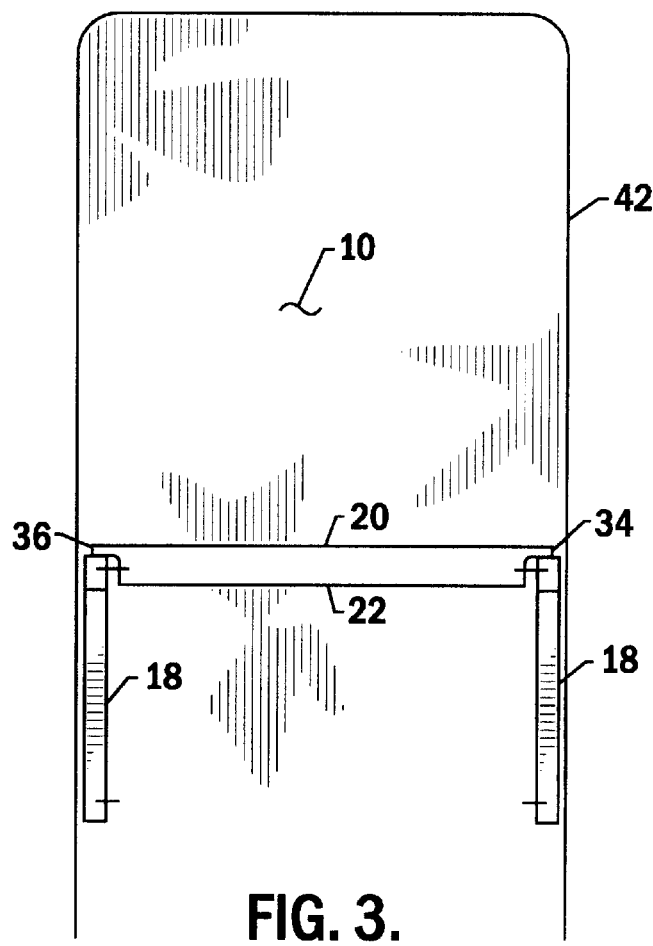
Figure 4:
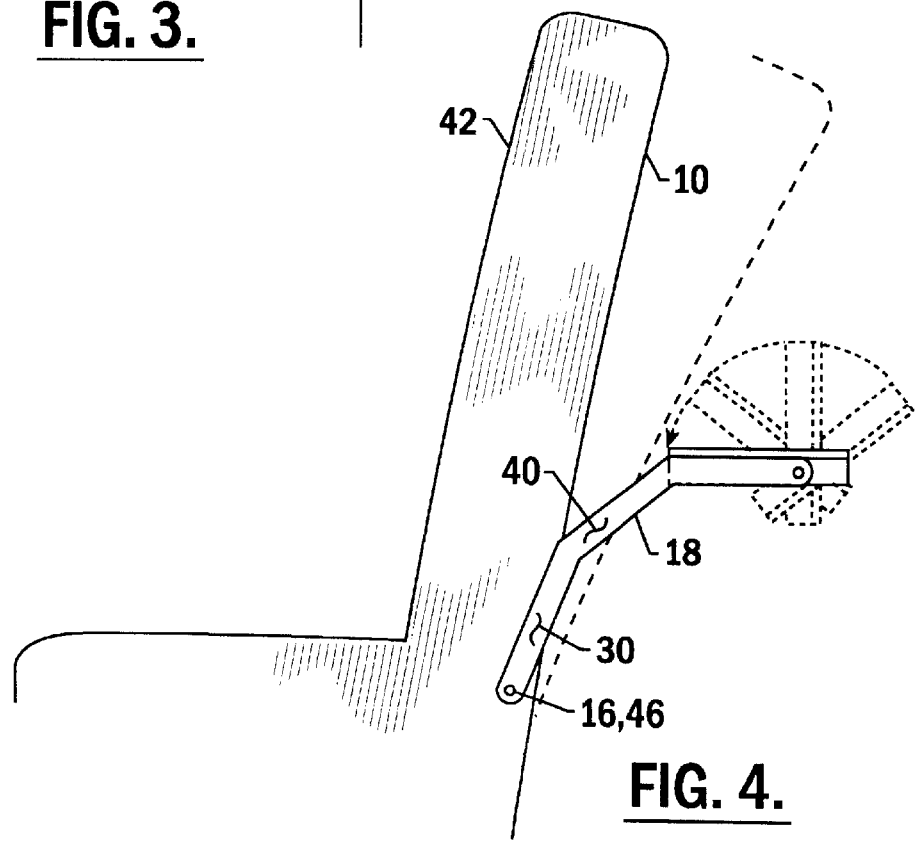

Having thus described the invention in general terms, reference will now be made to the accompanying drawings, which are not necessarily drawn to scale, and wherein:

FIG. 1 is a side elevational view of a tray table assembly of one advantageous embodiment of the present invention showing the assembly in a stowed position as solid lines and in extended position as dashed lines;

FIG. 2 is a side elevational view showing the tray table assembly of FIG. 1 in its operative position;

FIG. 3 is a rear elevational view showing the tray table assembly of FIG. 2; and;

FIG. 4 is a side elevational view showing the seatback in its lowered position and illustrating sequential views of the tray table of FIG. 1 as the tray table is rotated.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to FIG. 1, a seat assembly is shown equipped with a tray table assembly in accordance with a preferred embodiment of the invention broadly indicated by reference number 8. Typically, the seat assembly includes an aircraft seat 42 in which a tray table assembly is mounted in a rear portion of the seatback 10. However, the tray table assembly can be utilized in other applications, if so desired. The tray table assembly includes a tray table 12 and a support arm 18 which connects to the seatback 10. In this regard, the tray table 12 is typically pivotally mounted to the seatback 10 so as to pivot about an axis 16.

As indicated by both FIGS. 1 and 2, the tray table 12 is a generally planar member having a first major surface 20 that is generally flat for supporting articles. Although generally flat, the first major surface 20 may include a circumferential ridge for preventing at least some articles from rolling off of the tray table. In addition, the first major surface 20 may include one or more preformed depressions for receiving cups, cans or the like. The tray table also includes a generally flat second major surface 22 opposite the first major surface 20 and a pair of opposed side surfaces 24 extending between the first major surface and the second major surface. The tray table 12 further includes edge surfaces 26,28 extending between the opposed side surfaces 24 and between the first 20 and second 22 major surfaces. While the side 24 and edge surfaces 26,28 are typically perpendicular to the major surfaces 20,22 of the tray 12, the side and edge surfaces can have other configurations, if desired. While a substantially rectangular tray table 12 is depicted, it should be understood that the tray table may have other shapes. Although the tray table is typically formed of plastic, the tray table may be formed of other materials, if desired.

Support arm 18 is generally formed of aluminum or other metals and is capable of supporting the tray 12 as the support arm and tray pivot about the axis 16. Preferably, the tray table assembly includes more than one arm 18 and, in one common embodiment, includes a pair of parallel spatially separated arms for supporting the tray 12 and enabling the tray to pivot downwardly from the seatback. The support arm 18 is preferably designed to facilitate movement of the tray table between a stored position in which the tray table 12 is disposed in a recess defined by a seatback 10 as shown in solid lines in FIG. 1 and an extended position in which the tray table is held in a substantially horizontal position above the lap of a passenger as shown in dashed lines. The support arm 18 may have various configurations, but, in the illustrated embodiment, includes three sections serially connected to one another. A first section 30 of the arm is pivotally connected to the passenger seat 42 and is adapted to rotate about axis 16. The third section 32 of the arm is connected to the tray table as described below, while the second section 40 connects the first and third sections.

With reference to FIG. 3, the tray table 12 preferably has edges or lips 34,36 on both sides of the first major surface 20 of the tray which extend outwardly from the first major surface of the tray. From the perspective of a seated passenger, the lips 34,36 typically extend outwardly from the right and left sides of the tray table. As explained below, the lips 34,36 engage respective arms 18 when the tray table 12 is in the operative position (FIG. 2) and has been rotated such that the first major surface 20 faces upwardly to prevent the tray 12 from rotating further as forces are placed upon the tray table.

Support arm 18 is generally connected to tray 12 by pin 38 to permit the tray to pivot about an axis 44. The pin 38 is located proximate the distal end of the arm 18 and, in the illustrated embodiment, is carried by the third section 32. The pin 38 preferably engages a side surface 24 of the tray 12 at a position proximate a first edge 26 of the tray, i.e., the edge of the tray closest to the passenger once the tray table is in the extended position and the tray table has been pivoted such that the first major surface 20 is facing upwardly. Once the tray table 12 is rotated to the operative position as shown by solid lines in FIG. 2, the first edge 26 extends beyond the distal portion of the arm 18. By locating the pin 38 proximate the first edge of the tray 26, however, the tray 12 will not be prone to rotate back, i.e., flip toward the passenger, when forces are placed downwardly upon the first major surface 20 proximate the first edge. When the tray table assembly includes more than one support arm 18, the tray table assembly comprises a plurality of pins 38. Each pin 38 is associated with a respective arm 18 for connecting each arm to the tray 12. Each pin 38 is similarly located proximate the distal end of the respective support arm 18 and at a location closer to the first edge 26 than the opposed second edge 28 of the tray.

With reference to FIG. 3, when the tray 12 is in the extended position with the first major surface 20 facing downward, the lips 34,36 of the tray engage or rest upon the lower edges of the distal portion of the arms 18 to prevent further tray rotation. Similarly, when the tray 12 is pivoted as shown by dashed lines in FIG. 4 to the operative position as shown in FIG. 2 with first major surface facing upward, the lips 34,36 of the tray engage or rest upon the upper edges of the arms 18 to prevent further rotation. This engagement will provide the passenger upon a stable surface for which to place or support items. Also, this engagement ensures that the passenger will be capable of easily placing the tray table into position for use without requiring extensive knowledge or manually operating many moving parts.

According to another aspect of the present invention, a seat assembly is provided that includes a seat 42 defining a recess in the seatback 10 to house the tray assembly when in the stowed position, as shown in FIG. 1. The recess has similar but slightly greater dimensions than the arms 18 so as to allow the arms to also be fully positioned within the recess of the seatback 10 when stowed. Correspondingly, the recess is also dimensioned slightly larger than the tray 12 to allow the tray to be fully placed within the seatback 10 and ultimately secured in place, such as by means of a rotatable tab, clip or the like. By stowing the tray table assembly within the seatback 10, the tray table assembly will be non-obstructive to the passenger when not in use. When the tray table assembly is stowed in the seatback 10, the first major surface 20 of the tray 12 faces outwardly. The seatback recess can be shaped and sized so as to only receive the tray assembly when the first major surface 20 of the tray 12 is facing outwardly, thereby preventing the first major surface from facing the seat 42 in the stowed position. Since the first major surface 20 of the tray 12 is the surface that faces upwardly during use, the surface of the tray that may be soiled will face outwardly. This will ensure that the tray table surface that may become soiled during use will always be facing outwardly in the stowed position, so that this tray table surface can be easily inspected and cleaned, as opposed to the conventional method of first having to lower each tray table for inspection before cleaning.

The tray table assembly may be pivoted from a non-operative, stowed position as shown by solid lines in FIG. 1, to an extended operative position as shown in FIG. 2. Generally, the passenger will lower the tray table assembly and rotate the tray 12 so that the major surface 20 is facing upward as shown in FIG. 2. The tray arm 18 is capable of rotating clockwise from the stowed position to the extended position as shown by dashed lines in FIG. 1 when viewed from the left of the tray table assembly. When the tray arm 18 is initially placed in the extended position, the first major surface 20 of the tray 12 is facing downwardly. As demonstrated in FIG. 4, the entire tray 12 can be rotated counterclockwise when viewed from the left of the tray table assembly to an operative position so that the first major 20 surface faces upwardly. When the tray 12 is rotated to the operative position, the lips 34,36 of the tray will engage the support arms 18 to prevent further rotation and establish the operative position. Generally, the tray 12 can pivot at least 90° about an axis extending between the arms 18 when moving from the position in which the first major surface 20 faces downwardly to the operative position. FIG. 4 displays the tray table 12 of one advantageous embodiment that is capable of rotating about 180° until the lips 34,36 of the tray engages the upper edges of the support arms 18. The tray table assembly is preferably designed to be capable of rotating when the seat 42 is reclined as shown by dashed lines in FIG. 4. In this regard, the arms 18 and the tray table 12 are designed to provide ample clearance for rotation of the tray table while the seat 42 carrying the tray table assembly is fully reclined. Thus, the tray 12 is able to rotate between the positions shown in FIG. 4 at any reclined seat position, which gives the passenger unlimited use of the tray table. Following use, the tray 12 can be rotated to the position in which the first major surface 20 faces downwardly, and then the tray table assembly returned to the recess of the seatback 10 to a stowed position. Thus, the passenger raises and lowers the tray table assembly in a conventional manner between extended and stowed positions. The passenger is then only required to rotate the tray table 12 to the operative position as demonstrated in FIG. 4.

In sum, the invention provides a tray table assembly capable of moving between a stowed position and an operative position with the first major surface 20 of the tray 12 that faces upwardly during use, facing outwardly when in the stowed position. Since the first major surface 20 of the tray 12 is facing outwardly when not in use, the tray table assembly does not first need to be lowered before cleaning the tray table. Instead, the tray 12 may be cleaned while remaining in the stowed position. By facing outwardly while in the stowed position, the tray table assembly may be readily inspected without lowering the tray 12. As a result, the tray table assembly decreases the total time required to both inspect the tray tables and to clean the soiled tray tables. This in turn will increase the airline's efficiency during turnaround and decrease costs required to clean the aircraft.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A tray table assembly comprising:
   an arm adapted to move between a stowed position and an extended position; and
   a tray pivotally connected to said arm, said tray having opposed major surfaces and adapted to pivot while said arm is in the extended position, wherein said entire tray is adapted to pivot between a first position in which one major surface faces upwardly and a second position in which the other major surface faces upwardly, and wherein said tray is adapted to contact said arm while in the first and second positions to prevent further pivoting of said tray.

2. A tray table assembly according to claim 1 further comprising a pin connecting said arm to said tray.

3. A tray table assembly according to claim 2 wherein said tray has a side surface which extends between the opposed major surfaces of said tray, and wherein said pin engages the side surface of said tray.

4. A tray table assembly according to claim 2 wherein said pin connects to a distal end of said arm.

5. A tray table assembly according to claim 1 wherein said tray has first and second edges with the first edge extending beyond said arm while said tray is in the first position.

6. A tray table assembly according to claim 5 wherein said pin is connected to the side surface of said tray at a location closer to the first edge than the second edge.

7. A tray table assembly comprising:
   an arm adapted to move between a stowed position and an extended position; and
   a tray pivotally connected to said arm, said tray having opposed major surfaces and adapted to pivot while said arm is in the extended position, wherein said entire tray is adapted to pivot between a first position in which one major surface faces upwardly and a second position in which the other major surface faces upwardly, and wherein said tray has a lip for engaging opposite sides of said arm in the first and second positions.

8. A tray table assembly according to claim 7 wherein said lip is proximate to a major surface.

9. A tray table assembly comprising:
   at least two arms spaced apart and adapted to move between a stowed position and an extended position;
   a tray extending between said arms, said tray pivotally connected to each arm and adapted to pivot through an angle of greater than 90° about an axis extending between said arms and between first and second positions while said arms are in the extended position, said tray having a pair of opposed side surfaces and first and second edges extending between the opposed side surfaces; and a plurality of pins, wherein each pin is associated with a respective arm for connecting said arm to a respective side surface of said tray, and wherein each pin engages said tray at a location closer to the first edge than the second edge.

10. A tray table assembly according to claim 9 wherein said tray is adapted to pivot through an angle of 180°.

11. A tray table assembly according to claim 9 wherein each pin connects to a distal end of said respective arm.

12. A tray table assembly comprising:

at least two arms spaced apart and adapted to move between a stowed position and an extended position; and a tray extending between said arms, said tray pivotally connected to each arm and adapted to pivot through an angle of greater than 90° about an axis extending between said arms and between first and second positions while said arms are in the extended position, wherein said tray has a lip for engaging opposite sides of said arms in first and second positions.

13. A seat assembly comprising:

a seat having a seatback defining a recess therein; and a tray table assembly connected to said seat and adapted to be stowed in the recess defined by the seatback, said tray table assembly comprising:

an arm adapted to move between a stowed position and an extended position; and a tray pivotally connected to said arm, said tray having a major surface, wherein the major surface of said tray faces outwardly while said tray table assembly is stowed in the recess defined by the seatback, and wherein said tray is adapted to pivot once said arm is in the extended position between a first position in which the major surface faces upwardly and a second position in which the major surface faces downwardly.

14. A seat assembly according to claim 13 further comprising a pin connecting said arm to said tray.

15. A seat assembly according to claim 14 wherein said pin connects to a distal end of said arm.

16. A seat assembly according to claim 13 wherein said tray has first and second edges with the first edge extending beyond said arm while said tray is in the first position.

17. A seat assembly according to claim 16 wherein said pin is connected to said tray at a location closer to the first edge than the second edge.

18. A seat assembly comprising:

a seat having a seatback defining a recess therein; and a tray table assembly connected to said seat and adapted to be stowed in the recess defined by the seatback, said tray table assembly comprising:

an arm adapted to move between a stowed position and an extended position; and a tray pivotally connected to said arm, said tray having a major surface, wherein the major surface of said tray faces outwardly while said tray table assembly is stowed in the recess defined by the seatback, and wherein said tray is adapted to pivot once said arm is in the extended position between a first position in which the major surface faces upwardly and a second position, and wherein said tray has a lip for engaging opposite sides of said arm in the first and second positions.

19. A seat assembly according to claim 18 wherein said lip is proximate to the major surface.

* * * * *